Dec. 28, 1965     L. C. LAMING     3,225,956

PRESSURE VESSEL SEAL

Filed Aug. 17, 1962     2 Sheets-Sheet 1

INVENTOR
LINDON C. LAMING
BY
Richard H. Thomas

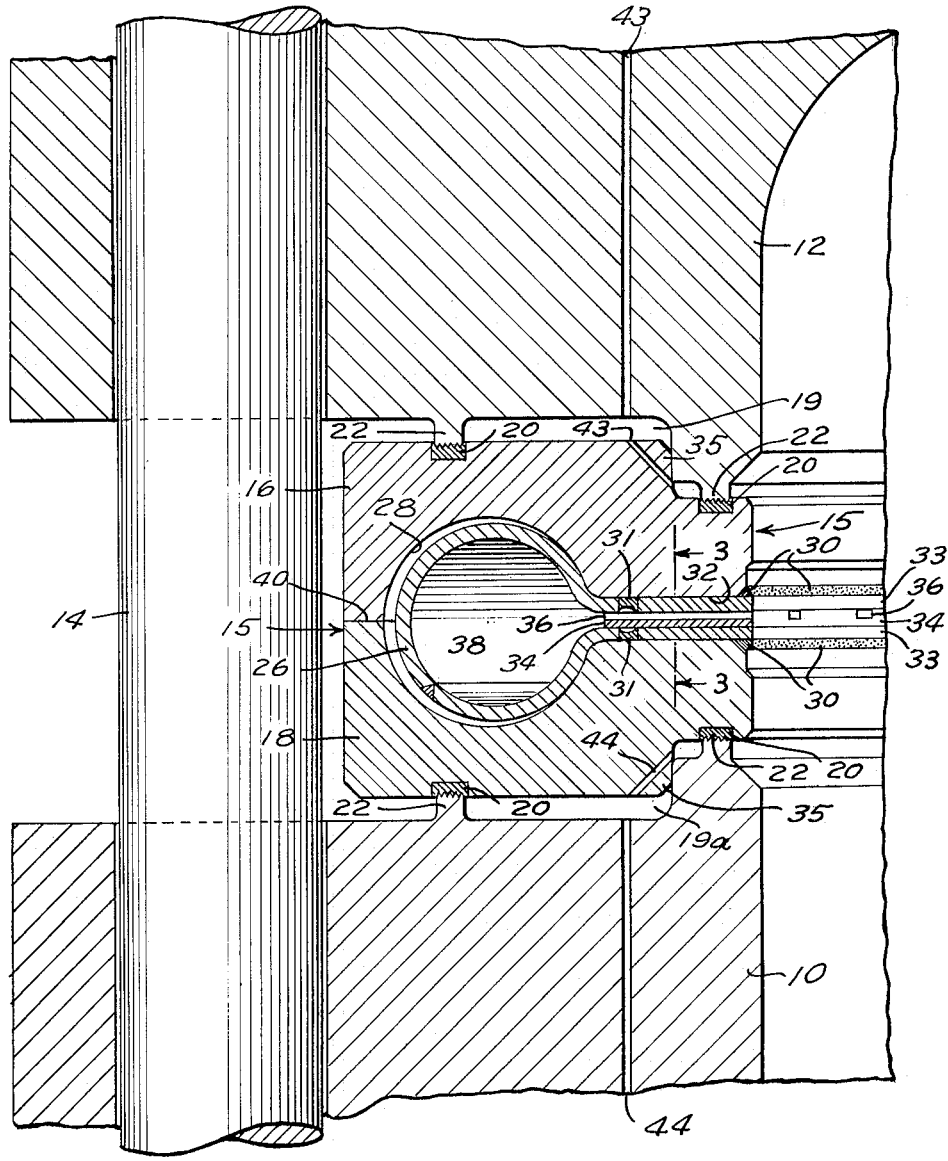

United States Patent Office 3,225,956
Patented Dec. 28, 1965

3,225,956
PRESSURE VESSEL SEAL
Lindon C. Laming, Redhill, Surrey, England, assignor to Foster Wheeler Corporation, New York, N.Y., a corporation of New York
Filed Aug. 17, 1962, Ser. No. 217,663
Claims priority, application Great Britain, Aug. 23, 1961, 30,418/61
6 Claims. (Cl. 220—46)

This invention relates to closure seals for pressure vessels, and in particular to seals for use in nuclear power plants.

Where such vessels have to be frequently opened, it is conventional for them to be provided with closure members held in position by bolts. If the vessel is subjected to varying conditions of operation such as frequent shutting down and re-starting, and changes of load, difficulty is often experienced in maintaining a tight joint. This invention is concerned with overcoming that difficulty.

In accordance with the invention, and for a pressure vessel having joined parts one of which may be a closure member, a pair of cooperating rings are provided between opposed surfaces of the parts, which rings are adapted to be tightened one against the other by bolts holding the vessel parts together. However, on stretching of the bolts by the pressure within the vessel, the rings are further adapted to be forced by that pressure away from each other and into sealing contact with the two parts joined by the bolts.

Towards this purpose, and to seal the space between the separated rings, the adjacent or cooperating facing surfaces of these rings are grooved so as to define a toroidal chamber, the latter containing a flexible toroidal membrane the inside of which is in communication with the inside of the pressure vessel. In addition, between the rings and the parts of the pressure vessel which are joined, there are arranged gaskets of soft metal or the like. With this construction, the pressure in the vessel, acting through the membrane forces the rings apart into good sealing contact through the gaskets with the joined parts fo the vessel while the membrane seals off the gap between the rings.

In a preferred embodiment, pairs of spaced apart concentric gaskets are disposed between the cooperating rings and the vessel parts. It will be apparent that the construction of the invention achieves equally good contact and sealing by all of the gaskets, but in the event leakage occurs in a gasket, the spaces defined by the concentric gaskets permit monitoring the sealing arrangement for the leakage.

An example of a flexible seal in accordance with the invention is shown in the accompanying drawings, in which.

Figure 1:
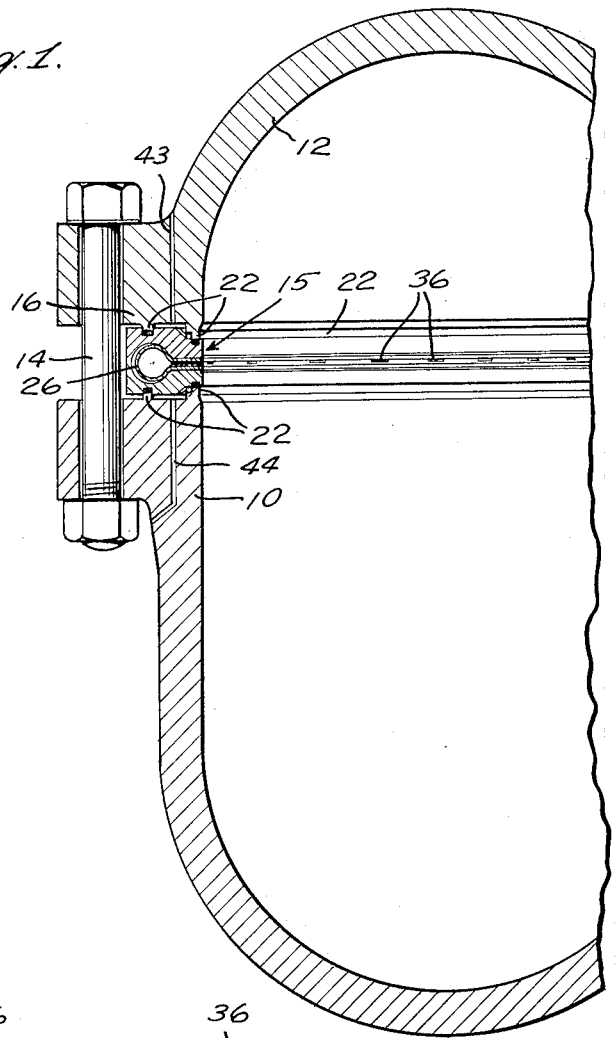
Figure 3:
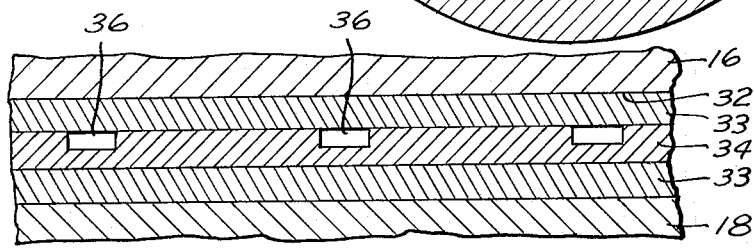
Figure 4:
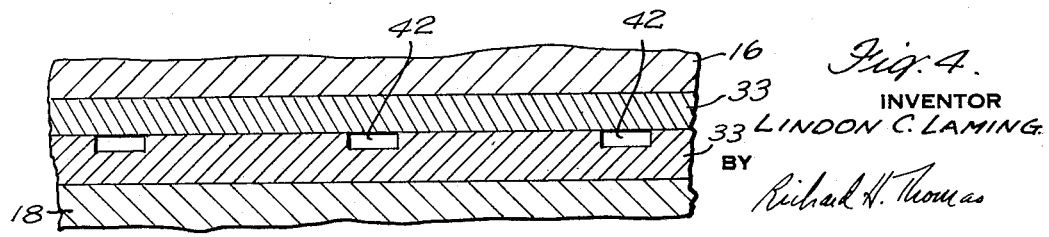

FIGURE 1 shows a location for the seal:
FIGURE 2 shows the seal itself on a larger scale:
FIGURE 3 is a section view taken along line 3—3 of FIG. 2; and
FIGURE 4 is a section view corresponding to FIG. 3 of an alternative construction.

Referring to FIG. 1, there is illustrated a pressure vessel having parts 10 and 12, for instance a vessel flange and a closure member, joined together by means of bolts 14 and sealed by an arrangement 15, which, as shown in FIG. 2, is made up of and includes two closure rings 16 and 18 disposed in upper and lower recesses 19 and 19a formed in the two parts. Concentric, spaced apart bearing rings 20 of soft metal, such as iron or aluminum, are embedded into the distal upper and lower surfaces of the closure rings and, opposite the bearing rings, the parts to be joined are provided with concentric, spaced apart, continuous ribs 22. The rib surfaces contiguous with the bearing rings are serrated, so that when the parts are pulled together by the bolts, the serrated ribs are pressed into the soft metal rings or gaskets 20 to provide a good seal.

If the vessel is then put under internal pressure, the bolts will undergo a longitudinal expansion relieving pressure on the rings 16 and 18 by the vessel parts, possibly resulting in a leak.

Such a leak is avoided by the provision of a flexible, toroidal, metal membrane 26 arranged between the closure rings. The rings in turn are provided in their facing surfaces with annular opposed grooves 28 which, between them, define a torus accommodating the membrane 26. Extending radially inwardly from the torus towards the center of the vessel the rings are also provided with a continuous slot or gap 32 communicating the torus with the inside of the vessel. The membrane, which is formed from a plain sheet of metal, is also provided with continuous, radial, inwardly extending, overlying lips or parts 33 adapted to be disposed within the ring gap 32, the dimensions being such that the gap 32 is approximately maintained. The inner free edges of the overlying lips or parts are then seam welded at 30 to the rings, and are also spot welded to the rings at points 31. In the gap 32 between the overlying parts 33 of the membrane, a flat washer-like ring or insert 34 having radial grooves 36 (FIG. 3) is seated or disposed establishing communication between the toroidal space 38 and the pressure vessel. The purpose of the insert 34 is to maintain the gap 32 against compression of the assembly 15 by tightening on the bolts 14.

With this construction, the pressure in the vessel forces the rings 16 and 18 apart into intimate sealing contact with the ribs 22 while producing a gap along line 40 between the rings. The latter however are sealed against leakage by the membrane 26.

If the vessel has to be opened, the bolts are removed and the entire assembly comprising rings 16 and 18 and membrane 26 is removed intact, and replaced on reassembly.

In an alternative construction shown in FIG. 4, the overlying parts 33 of the membrane 26 are arranged without the existence of a gap between them. In this case, one of those parts, which is preferably of increased thickness, is formed with grooves 42 corresponding to the grooves 36 in FIG. 3.

As a further alternative, the grooves 36 could be made to extend clear through the ring 34 dividing the ring into segments, the segments then being held in position by being welded to one of the overlying parts of the membrane 26.

As an important aspect of the invention, the rings 16 and 18 are provided with shoulders 35 cooperating with corresponding shoulders on the parts to be joined and serving for locating the parts relatively to each other. Vents 43 and 44 are provided to ensure that pressure does not build up between the inner and outer seals, but in addition these vents also serve to monitor leakage into the space between the seals and lead either to a pump which returns the leakage to the system or to other safe disposal means.

Other modifications and variations will be apparent to those skilled in the art and within the scope and spirit of the invention as defined in the following claims.

What is claimed is:

1. In a pressure vessel having a closure member therefor, a sealing arrangement cooperating with said vessel and closure member comprising a pair of continuous annular mating rings adapted to be disposed between opposed surfaces of said vessel and closure member, the facing surfaces of said rings being grooved to define a toroidal chamber, a flexible toroidal membrane disposed within said chamber, means communicating the inside of the pressure vessel with the inside of said toroidal membrane, pairs of gasket means disposed on opposite sides of said rings between distal surfaces of the rings and the opposed surfaces of the vessel and closure member, each gasket means comprising in combination an annular continuous ring of pliable material and an opposite continuous ring having at least one continuous knife-like blade adapted to press into the pliable material, the pressure within the vessel forcing said rings apart and in good sealing contact with said opposed surfaces, said pairs of gasket means providing sealed-off spaces on opposite sides of the ring members.

2. In a pressure vessel having opposed surfaces to be joined, a sealing arrangement cooperating with said surfaces comprising a pair of continuous annular rings having facing surfaces, said ring facing surfaces being grooved to define a toroidal chamber, a flexible toroidal membrane disposed within said chamber and being in fluid communication with the inside of the pressure vessel, pairs of concentric gasket means on opposite sides of said ring members between the distal surfaces of the ring members and said opposed surfaces of said vessel, said gasket means comprising in combination an annular imbedded bearing ring of soft metal and an opposite continuous rib having a serrated surface adapted to press into said bearing ring, the pressure within the vessel forcing said ring members apart and in good sealing contact through said gasket means with said opposed surfaces, said pairs of gasket means providing sealed off spaces on opposite sides of the ring members.

3. In a pressure vessel having a closure member therefor, a sealing arrangement cooperating with said vessel and closure member comprising a pair of continuous annular, mating rings adapted to be disposed between opposed surfaces of said vessel and closure member, the facing surfaces of said rings being grooved to define a toroidal chamber, said rings further being formed to define a continuous annular slot extending radially between the inside of the vessel and said chamber, a flexible toroidal membrane disposed within said chamber, said membrane having annular continuous overlying parts extending radially in said slot and welded to said mating rings, means defining between said overlying parts a plurality of radial passageways extending between the inside of the vessel and the inside of said membrane, and pairs of concentric gasket means disposed on opposite sides of said rings between distal surfaces of the rings and the opposed surfaces of the vessel and closure member, the pressure within the vessel forcing said rings apart and in good sealing contact with said opposed surfaces.

4. In a pressure vessel according to claim 3 wherein said membrane overlying parts are welded at their free ends to said rings with a seal weld to avoid crevices exposed to the inside of the vessel.

5. In a pressure vessel according to claim 4 wherein one of said membrane overlying parts is provided with a plurality of radial grooves extending between the inside of the vessel and the inside of said membrane.

6. In a pressure vessel having a closure member therefor, a sealing arrangement cooperating with said vessel and closure member comprising a pair of continuous annular, mating rings adapted to be disposed between opposed surfaces of said vessel and closure member, the facing surfaces of said rings being grooved to define a toroidal chamber, said rings further being formed to define a continuous annular slot extending radially between the inside of the vessel and said chamber, a flexible toroidal membrane disposed within said chamber, said membrane having annular, continuous, overlying surfaces extending radially in said slot and welded to said mating rings, ring means disposed between said overlying surfaces having radial grooves defining with one of said surfaces a plurality of passageways extending between the inside of the vessel and the inside of said membrane, and pairs of concentric gasket means on opposite sides of said rings between distal surfaces of the rings and the opposed surfaces of the vessel and closure member, the pressure within the vessel forcing said rings apart and in good sealing contact with said opposed surfaces.

References Cited by the Examiner
UNITED STATES PATENTS

| | | |
|---|---|---|
| 1,665,827 | 4/1928 | Tillman. |
| 2,126,505 | 8/1938 | Risser. |
| 2,666,092 | 1/1954 | Balzer _____ 220—46 |
| 3,062,401 | 11/1962 | Needham _____ 220—46 |

THERON E. CONDON, *Primary Examiner.*

EARLE J. DRUMMOND, GEORGE O. RALSTON,
*Examiners.*